(12) United States Patent
Masini

(10) Patent No.: US 12,618,474 B2
(45) Date of Patent: May 5, 2026

(54) SWIVEL SEAL ASSEMBLY AND ALIGNMENT METHOD

(71) Applicant: DEUBLIN COMPANY, LLC, Waukegan, IL (US)

(72) Inventor: Paul M. Masini, Mount Prospect, IL (US)

(73) Assignee: DEUBLIN COMPANY, LLC, Waukegan, IL (US)

( * ) Notice: Subject to any disclaimer, the term of this patent is extended or adjusted under 35 U.S.C. 154(b) by 0 days.

(21) Appl. No.: 19/320,564

(22) Filed: Sep. 5, 2025

(65) Prior Publication Data

US 2026/0071682 A1 Mar. 12, 2026

Related U.S. Application Data

(60) Provisional application No. 63/691,489, filed on Sep. 6, 2024.

(51) Int. Cl.
*F16J 15/34* (2006.01)
*E21B 17/05* (2006.01)
(52) U.S. Cl.
CPC .............. *F16J 15/34* (2013.01); *E21B 17/05* (2013.01)
(58) Field of Classification Search
CPC ...... F16J 15/34; F16J 15/3464; F16J 15/3472; F16J 15/348; E21B 17/05
See application file for complete search history.

(56) References Cited

U.S. PATENT DOCUMENTS

| | | | | |
|---|---|---|---|---|
| 6,007,105 | A | * 12/1999 | Dietle | ................. F16L 27/0828 |
| | | | | 285/94 |
| 7,343,968 | B2 | 3/2008 | Kubala | |
| 2006/0042789 | A1* | 3/2006 | Kubala | ................. F16L 27/082 |
| | | | | 166/88.4 |
| 2016/0356382 | A1* | 12/2016 | Dietle | ................. F16L 27/0828 |
| 2018/0355975 | A1* | 12/2018 | Petrou | .................... F16L 37/22 |

* cited by examiner

*Primary Examiner* — Gilbert Y Lee
(74) *Attorney, Agent, or Firm* — GREENBLUM & BERNSTEIN, P.L.C.

(57) ABSTRACT

A swivel seal assembly includes a first alignment fixture mountable to an adapter flange and having an alignment cylinder; a second alignment fixture mountable to a rotating lower nut and having an alignment cylinder, where in the first alignment cylinder is inserted into the second alignment cylinder in a sliding fit; the adapter flange having a locating fixture to concentrically align a non-rotating upper nut with the adapter flange, the adapter flange being concentrically aligned with the lower nut and a rotating seal assembly when the first alignment cylinder is inserted into the second alignment cylinder; a stationary seal assembly having a stationary seal ring with an annular projection; the rotating seal assembly having a rotating seal ring with an annular projection, wherein the annular projections are concentrically aligned with one another in a sealing relationship when the rotating seal assembly and stationary seal assembly are concentrically aligned.

4 Claims, 7 Drawing Sheets

SWIVEL SEAL ASSEMBLY AND ALIGNMENT METHOD

CROSS-REFERENCE TO RELATED APPLICATION

The present application claims the benefit of U.S. Provisional Application No. 63/691,489 filed Sep. 6, 2024, the disclosure of which is expressly incorporated by reference herein in its entirety.

BACKGROUND

1. Field of the Invention

The present disclosure relates to swivel seal assemblies for use in fluid coupling devices for high speed and/or high-pressure applications, and, more particularly, to a swivel seal assembly providing for extended life of sealing members within the swivel seal assembly.

2. Discussion of Background Information

Fluid coupling devices are utilized in high-speed drilling operations where it is necessary to couple the outlet of a fluid source to the rotating device. For example, swivel seal assemblies are utilized in oil and gas drilling operations to provide a sealing arrangement between the washpipe and the rotating sealing housing.

One type of a drilling rig swivel seal assembly utilizes a stack of rotary seals which are typically comprised of reinforced elastomeric material that provide a dynamic sealing arrangement with the external cylindrical sealing surface of the washpipe.

An improved swivel seal assembly disclosed in U.S. Pat. No. 7,343,968 incorporates a stationary seal in a stationary, floating seal assembly that is mounted to the non-rotating portion of the swivel seal assembly and is configured to engage a rotating seal in a rotating seal assembly mounted to a rotating portion of the swivel seal assembly to provide a sealing arrangement between the rotating seal assembly and the floating seal assembly.

The rotating seal is provided with a generally flat sealing surface, while the stationary seal has an annular projection in its sealing surface. This is referred to as a nose-to-flat sealing profile. While nose-to-flat seal profiles provide an improved seal lifespan relative to earlier swivel seal designs, they still suffer from wear issues resulting from the nose eventually wearing a groove into the flat sealing surface, thereby causes damage to the outside and inside diameters of the nose face seal ring. This affects the load balance ratio, which, in turn, contributes to a higher leakage rate.

The swivel seal assembly of the present disclosure extends the life of the seals within the swivel seal assembly relative to the prior art described above.

SUMMARY

In general terms, the swivel seal assembly described in the present disclosure includes an assembly and method for increasing the lifespan of a swivel seal assembly.

One object of the present disclosure is to provide a swivel seal assembly and seal alignment method for effective incorporation of a nose-to-nose sealing arrangement into the swivel seal assembly.

According to an aspect of the present disclosure, a swivel seal assembly having a non-rotating upper nut, having a sleeve and a carrier assembly and a stationary seal assembly connected with the carrier assembly, and a rotating lower nut having a rotating seal assembly mounted on the rotating lower nut includes a first alignment fixture having a flange and an alignment cylinder extending from the flange and wherein the first alignment fixture alignment cylinder is provided with an outside diameter; a second alignment fixture having a flange and an alignment cylinder, wherein the second alignment fixture flange is configured for mounting to the rotating lower nut, wherein the second alignment fixture alignment cylinder is provided with an inside diameter greater than the outside diameter of the first alignment fixture alignment cylinder; wherein the first alignment fixture alignment cylinder is configured to be inserted into the second alignment fixture alignment cylinder in a sliding fit; an adapter flange having a planar base and an annular flange extending from the planar base, wherein the first alignment fixture flange is configured for mounting to the planar base and wherein the planar base includes at least one locating fixture extending from the planar base parallel to the annular flange of the adapter flange, wherein the adapter flange is concentrically aligned with the rotating lower nut and the rotating seal assembly when the first alignment cylinder is inserted into the second alignment cylinder; wherein the non-rotating upper nut comprises an alignment pilot configured to accept the locating fixture of the adapter flange to position the non-rotating upper nut into concentric alignment with the adapter flange, the adapter flange being further configured for mounting to the sleeve and carrier assembly in concentric alignment; wherein the stationary seal assembly comprises a stationary seal retainer and a stationary seal ring having an annular protrusion on a sealing surface of the stationary seal ring; wherein the rotating seal assembly comprises a rotating seal retainer and a rotating seal ring having an annular protrusion on a sealing surface of the stationary seal ring; and wherein the stationary seal ring sealing surface and the rotating seal ring sealing surface face one another, and wherein the rotating seal ring annular protrusion and the stationary seal ring annular protrusion are concentrically aligned with and directly engage one another in a sealing relationship when the rotating seal assembly and stationary seal assembly are concentrically aligned with one another.

According to another aspect of the present disclosure, a swivel seal assembly also includes a stationary seal pilot ring mounted on and concentrically aligned with the carrier assembly and configured to contain the stationary seal assembly within the stationary seal pilot ring in concentric alignment with the carrier assembly; and a rotating seal pilot ring mounted on and concentrically aligned with the lower nut and configured to contain the rotating seal assembly within the rotating seal pilot ring in concentric alignment with the lower nut.

According to another aspect of the present disclosure, an alignment assembly for a swivel seal assembly having a non-rotating upper nut, having a sleeve and a carrier assembly and a stationary seal assembly connected with the carrier assembly, a rotating lower nut having a rotating seal assembly mounted on the rotating lower nut, wherein the rotating seal assembly comprises a rotating seal retainer and a rotating seal ring having an annular protrusion on a sealing surface of the stationary seal ring, wherein the stationary seal ring sealing surface and the rotating seal ring sealing surface face one another, and wherein the rotating seal ring annular protrusion and the stationary seal ring annular protrusion are concentrically aligned with and directly engage one another in a sealing relationship when the rotating seal assembly and stationary seal assembly are concentrically aligned with one another, includes a first alignment fixture having a flange and an alignment cylinder extended from the flange and wherein the first alignment fixture alignment cylinder is provided with an outside diameter; a second alignment fixture having a flange and an alignment cylinder, wherein the second alignment fixture flange is configured for mounting to the rotating lower nut, wherein the second alignment fixture alignment cylinder is provided with an inside diameter greater than the outside diameter of the first alignment fixture alignment cylinder; wherein the first alignment fixture alignment cylinder is configured to be inserted into the second alignment fixture alignment cylinder in a sliding fit; an adapter flange having a planar base and an annular flange extending from the planar base, wherein the first alignment fixture flange is configured for mounting to the planar base and wherein the planar base includes at least one locating fixture extending from the planar base parallel to the annular flange of the adapter flange, wherein the adapter flange is concentrically aligned with the rotating lower nut and the rotating seal assembly when the first alignment cylinder is inserted into the second alignment cylinder; wherein the non-rotating upper nut comprises an alignment pilot configured to accept the locating fixture of the adapter flange to position the non-rotating upper nut into concentric alignment with the adapter flange, the adapter flange being further configured for mounting to the sleeve and carrier assembly in concentric alignment; wherein the stationary seal assembly comprises a stationary seal retainer and a stationary seal ring having an annular protrusion on a sealing surface of the stationary seal ring; wherein the rotating seal assembly comprises a rotating seal retainer and a rotating seal ring having an annular protrusion on a sealing surface of the stationary seal ring; wherein the stationary seal ring sealing surface and the rotating seal ring sealing surface face one another, and wherein the rotating seal ring annular protrusion and the stationary seal ring annular protrusion are concentrically aligned with and directly engage one another in a sealing relationship when the rotating seal assembly and stationary seal assembly are concentrically aligned with one another; a stationary seal pilot ring mounted on and concentrically aligned with the carrier assembly and configured to contain the stationary seal assembly within the stationary seal pilot ring in concentric alignment with the carrier assembly; and a rotating seal pilot ring mounted on and concentrically aligned with the rotating lower nut and configured to contain the rotating seal assembly within the rotating seal pilot ring in concentric alignment with the rotating lower nut.

According to another aspect of the present disclosure, a method of aligning a swivel seal assembly having a non-rotating upper nut, having a sleeve and a carrier assembly and a stationary seal assembly connected with the carrier assembly, a rotating lower nut having a rotating seal assembly mounted on the rotating lower nut, wherein the rotating seal assembly comprises a rotating seal retainer and a rotating seal ring having an annular protrusion on a sealing surface of the stationary seal ring and having an inside diameter and an outside diameter, wherein the stationary seal ring sealing surface and the rotating seal ring sealing surface face one another, and wherein the inside diameter and outside diameter of the rotating seal ring annular protrusion are approximately the same as the insider diameter and outside diameter of the stationary seal ring annular protrusion such that the rotating seal ring annular protrusion and the stationary seal ring annular protrusion are concentrically aligned with and directly engage one another in a sealing relationship when the rotating seal assembly and stationary seal assembly are concentrically aligned with one another, includes the steps of assembling the non-rotating upper nut and rotating lower nut; mounting an adapter flange to a flange of a top alignment fixture; mounting a bottom alignment fixture to the lower nut; inserting an alignment cylinder of the top alignment fixture into an alignment cylinder of the bottom alignment fixture and collapsing the top and bottom alignment fixtures together; raise the top alignment fixture and adapter flange and align a locating fixture of the adapter flange with an alignment pilot of the non-rotating upper nut to align the non-rotating upper nut with the adapter flange; secure the upper nut to the adapter flange; remove the top and bottom alignment fixtures; and fasten the adapter flange to the sleeve, carrier assembly, and stationary seal assembly.

These and other aspects are merely illustrative of the innumerable aspects associated with the present disclosure and should not be deemed as limiting in any manner. These and other aspects, features, and advantages of the present disclosure will become apparent from the following detailed description when taken in conjunction with the referenced drawings.

BRIEF DESCRIPTION OF THE DRAWINGS

Reference is now made more particularly to the drawings, which illustrate the best presently known mode of carrying out the present disclosure and wherein similar reference characters indicate the same parts throughout the views.

DETAILED DESCRIPTION

Figure 1:
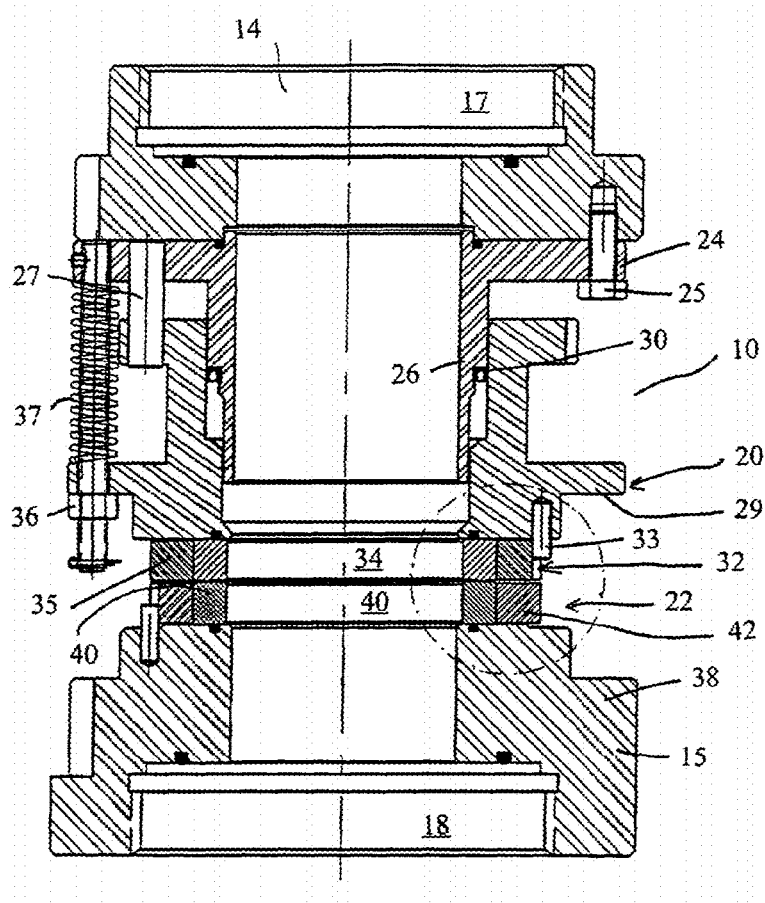
FIG. 1 is a cross-sectional view of prior art swivel seal assembly incorporating a floating seal assembly incorporation a nose-to-flat seal arrangement.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein are for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

FIG. 1 provides a cross-sectional view of a prior art swivel seal assembly 10 as described in U.S. Pat. No. 7,343,968, the entire disclosure of which is incorporated by reference herein. The swivel seal assembly 10 incorporates a floating seal arrangement wherein a second conduit member 18 is positioned coaxially with respect to a first conduit member 17 and wherein the second conduit member is rotatable and is representative of a drill string or similar member 15, and the first conduit member is non-rotatable and is representative of a hose or similar member 14.

A floating seal assembly 20 mounted to the non-rotating first conduit member 17 which is structurally arranged to engage a rotating seal assembly 22 which is mounted to the rotating second conduit member 18 to provide a sealing arrangement between the rotating and floating seal members. A tubular floating seal guide member 24 is aligned with the first conduit member 17 and is coaxially secured thereto by a fastening member 25 and anti-rotation pins 27. The floating seal guide member 24 includes a tubular extension or washpipe member 26, which is structurally arranged to permit drilling fluid to pass therethrough from the first conduit member 17 to the rotating second conduit member 18. The tubular or washpipe member 26 of the seal guide member 24 is structurally arranged to cooperate with a floating seal member 29 in a male-female relationship, with a secondary U-cup seal member 30 positioned between the floating seal member and the tubular washpipe member 26. The U-cup shaped seal member 30 prevents escape of abrasive drilling fluid from the drilling rig swivel or coupling assembly 10.

The floating seal assembly 20 is mounted to the stationary portion of the coupling device or assembly 10 and is aligned to the stationary conduit member 17 with anti-rotation pins 27 to ensure that the floating seal guide member permits directional fluid flow therebetween. The washpipe extension member 26 is surrounded by the floating seal member 29 to define a seal chamber 31 therebetween. The seal chamber 31 includes a secondary U-cup seal ring 30 therebetween to prevent escape of the abrasive containing fluid from the swivel unit during operation.

A floating seal ring assembly 32 is keyed 33 to the floating seal member 29. The floating seal ring assembly 32 is comprised of a first ceramic seal ring member 34 which is mounted within a circular stationary steel ring member 35 by heat shrinking the steel ring member about the first ceramic seal ring member. This floating seal member 29 is mounted to the floating guide member 24 by floating seal retracting nut 36. The retracting nut 36 compresses a spring member 37 which provides a squeeze force between the floating seal ring assembly 32 and the first ceramic seal ring 34, and a second ceramic sealing ring member 40, which is keyed and mounted to an adaptor plate member 38 secured to the rotating or second conduit member 18. The rotating second ceramic seal ring member 40 is also heat shrunk mounted with a steel ring member 42.

Figure 2:
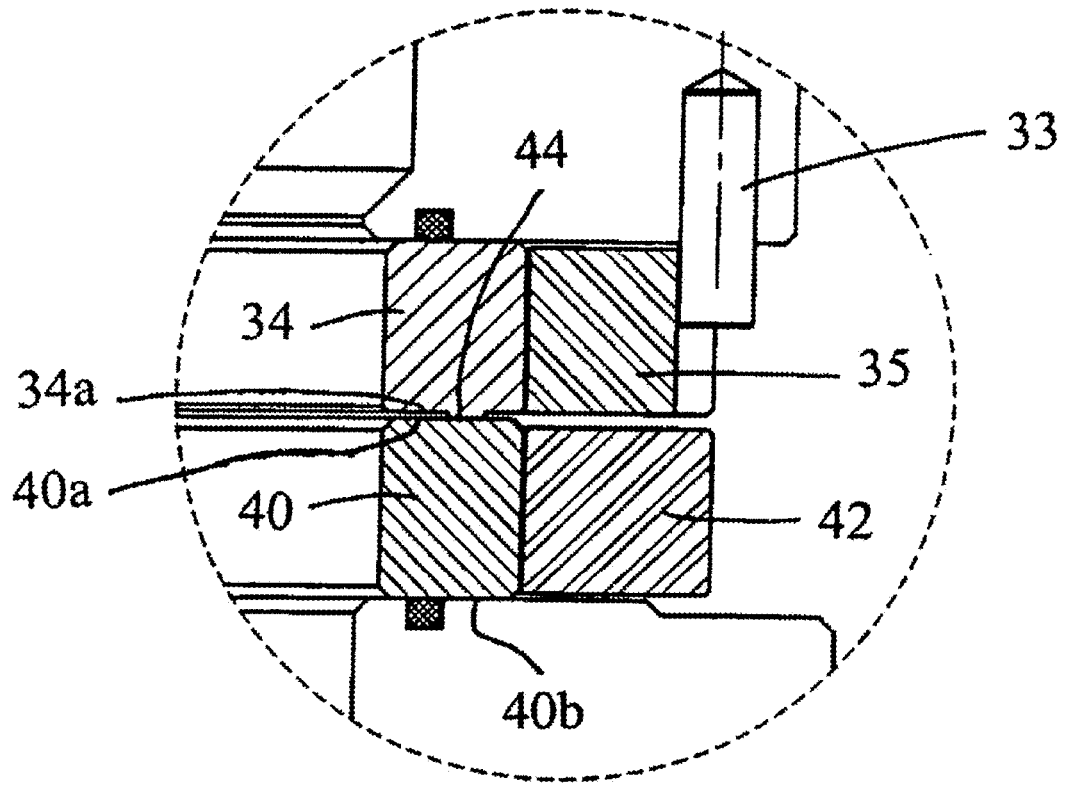
FIG. 2 is an enlarged view of the floating swivel seal assembly shown in the circle in FIG. 1, illustrating the nose-to-flat seal arrangement in more detail.

As shown in enlarged detail in FIG. 2, the cross-sectional configuration of the first and second ceramic seal ring members 34 and 40, respectively, are approximately rectangular or square in shape with the first ceramic sealing ring 34 having an annular projection 44 extending outwardly from the seal surface 34a of the sealing ring. The annular projection 44 provides a planar outer surface which enables sealing engagement with the sealing surfaces 40a and 40b of the second annular sealing ring 40. The annular projection 44 has an inside diameter greater than the inside diameter of the second ceramic seal ring and has an outside diameter which is less than the outside diameter of the second ceramic sealing ring.

FIGS. 3 through 6 depict an embodiment of swivel seal system assembly 100 according to the present disclosure. This and other embodiments are applicable to any type of fluid conducting swivel assemblies wherein a first conduit member is positioned coaxially with respect to a second conduit member and wherein the first conduit member is rotatable and is representative of a drill string or similar member, and the second conduit member is non-rotatable and is representative of a hose or similar member.

Components of the swivel seal assembly 100 corresponding to those present in the prior art swivel seal assembly 10 are denoted with similar reference numbers beginning with 1. A stationary seal assembly 120 is mounted to a non-rotating upper nut 202 which is structurally arranged to engage a rotating seal assembly 122 which is mounted to a rotating lower nut 204 to provide a sealing arrangement between the rotating and stationary components of the swivel seal assembly 100. A flange 124 of a sleeve 126 is aligned with non-rotating upper nut 202 and is coaxially secured thereto by a fastening member 125 and anti-rotation pins 127. The sleeve 126 provides a conduit for drilling fluid to pass from the stationary conduit to the rotating conduit. The sleeve 126 is surrounded by a carrier assembly 129 to define a seal chamber 131 therebetween. The seal chamber 131 houses a secondary O-ring seal 130 therebetween to prevent escape of the abrasive containing fluid from the swivel unit during operation.

The sleeve 126 is structurally arranged to cooperate with the carrier assembly 129 in a male-female relationship. The sleeve 126 and carrier assembly 129 are connected with one another by at least one threaded rod 136 and allocating fixture, such as a dowel pin, 127, which may permit a degree of relative axial movement between the sleeve 126 and carrier assembly 129. A nut 138 on the threaded rod 136 below a flange of the carrier assembly 129 limits such relative axial movement. The threaded rod 136 is inserted through a spring 137, which is captured between the flange of the carrier assembly 129 and the flange 124 of the sleeve 126. A set screw 139 threaded through an edge of the flange 124 contacts the end portion of the threaded rod 136 to hold it in place relative to the flange 124. The spring 137 exerts a downward force on the flange of the carrier assembly 129 and the stationary seal assembly 120 to maintain engagement of the stationary seal assembly 120 with the rotating seal assembly 122.

The stationary seal assembly 120 is keyed to the carrier assembly 129. The stationary seal assembly 120 includes a stationary seal ring 134 mounted within a stationary seal retainer 135, for example, by heat shrinking the stationary seal retainer 135 about the stationary seal ring 134. In some embodiments, the stationary seal ring 134 may be made of a ceramic material, and the stationary seal retainer 135 may be made of steel. The rotating seal assembly 122 includes a rotating seal ring 140 mounted within a rotating seal retainer 142, for example, by heat shrinking the rotating seal retainer 142 about the rotating seal ring 140. In some embodiments, the rotating seal ring 140 may be made of a ceramic material, and the rotating seal retainer 142 may be made of steel.

Figure 6:
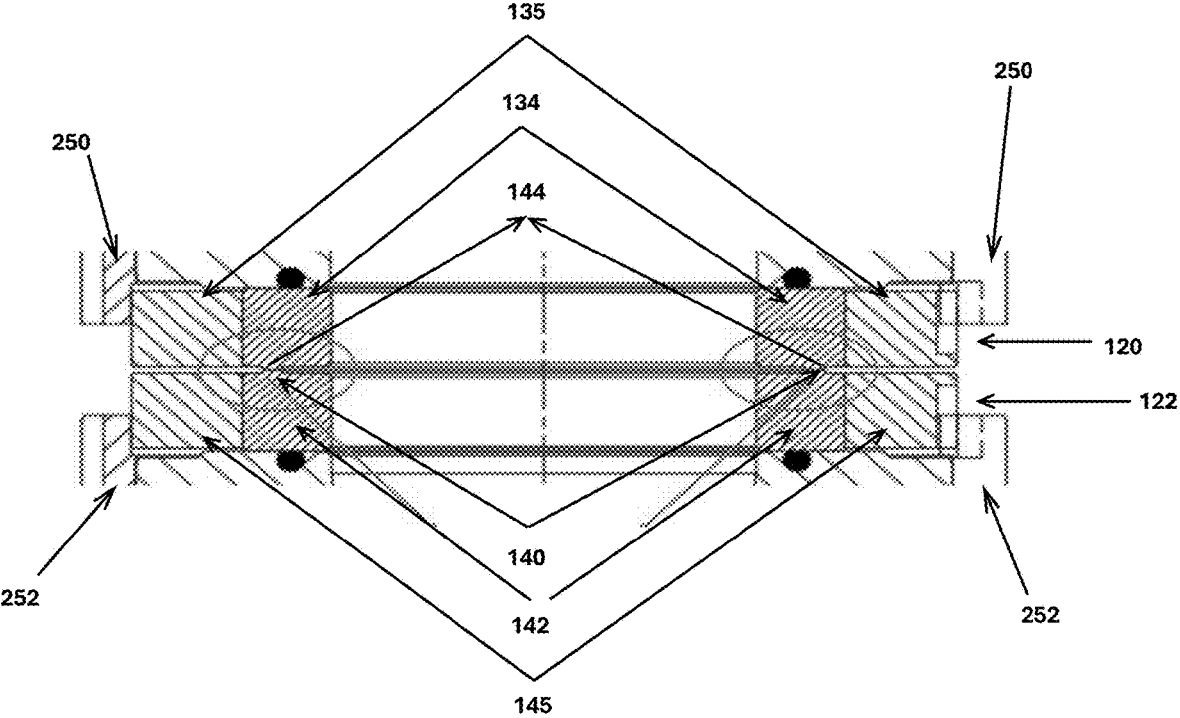
FIG. 6 is an enlarged view of a floating swivel seal assembly according to an embodiment of the present disclosure, illustrating a nose-to-nose seal arrangement in more detail.

The cross-sectional configuration of the stationary and rotating seal rings 134 and 140 is illustrated in more detail in FIG. 6. A seal surface 134a of the stationary seal ring 134 contacting the rotating seal ring 140 is provided with a first, stationary annular projection 144 extending outwardly from the seal surface 134a of the stationary seal ring 134. A seal surface 140a of the rotating seal ring 140 contacting the stationary seal ring 134 is provided with a second, rotating annular projection 145 extending outwardly from the seal surface 134a of the rotating seal ring 140. When the stationary 134 and rotating 140 seal rings are properly aligned, planar outer surfaces of the first 144 and second 145 annular projections engage one another in a sealing engagement. The dimensions of the stationary 134 and rotating 140 seal rings are preferably identical to one another. The inside and outside diameters of the stationary seal ring annular projection 144 and the rotating seal ring annular projection 145 may be approximately the same or identical within applicable manufacturing tolerances. The inside and outside diameters of the stationary 134 and rotating seal rings may also be approximately the same or identical within applicable manufacturing tolerances.

The nose-to-nose seal arrangement of the illustrated embodiment and other embodiments according to the present disclosure provide significantly improved wear characteristics while maintaining a desired load balance ratio for the swivel seal assembly. For example, a nose-to-nose seal arrangement avoids the limitation of prior art nose-to-flat seal arrangements in which the nose of the stationary seal ring wears a groove in the face of the rotating seal ring and in which the corners of the nose experience become worn and rounded off. These wear patterns in a nose-to-flat arrangement cause an undesirable in the load balance ratio of the swivel seal assembly. However, a nose-to-nose seal arrangement does present additional challenges in aligning, and maintaining the required alignment of, the stationary and rotating seal rings to maximize the benefits of the nose-to-nose arrangement, which embodiments of the present disclosure address.

Figure 3:
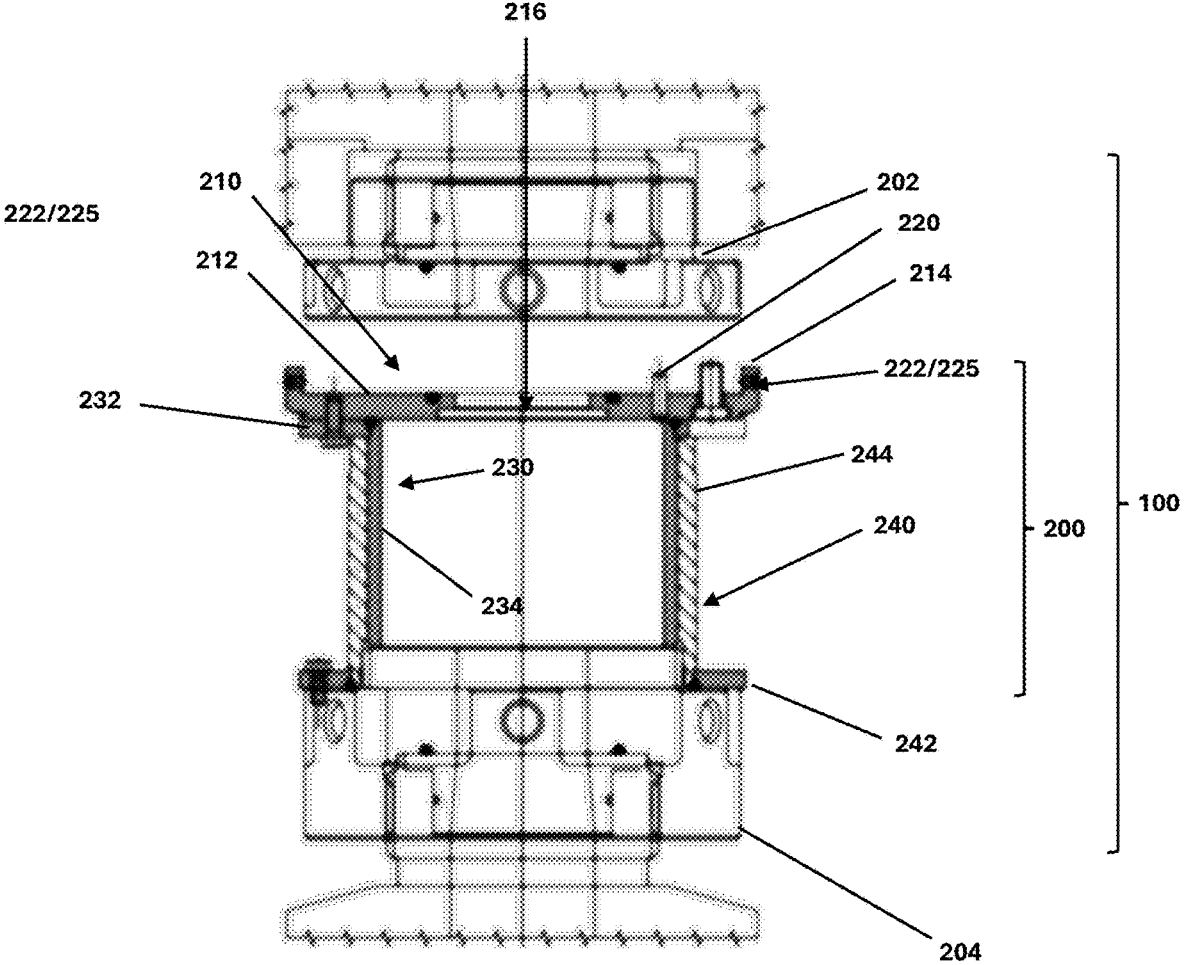
FIG. 3 is cross-sectional view of a swivel seal assembly according to an embodiment of the present disclosure in a partially assembled state.
Figure 4:
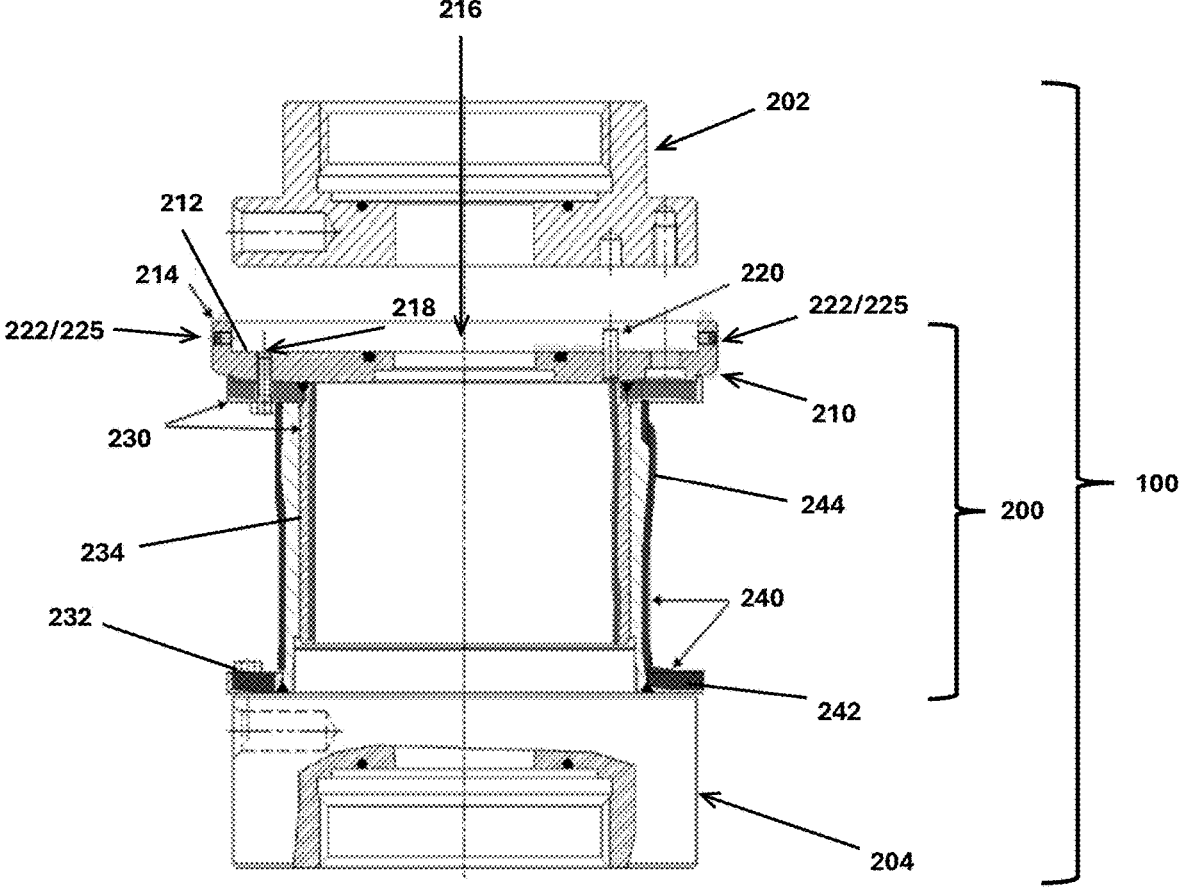
FIG. 4 is a cross-sectional view of the swivel seal assembly of FIG. 3.

FIGS. 3 and 4 illustrate a first portion of an alignment assembly 200 to position the floating seal assembly 120 and rotating seal assembly 122 into a concentric alignment along with the other components of the swivel seal assembly 100 according to an embodiment of the present disclosure. The alignment assembly 200 includes an adapter flange 210, a top alignment fixture 230, and a bottom alignment fixture 240. The adapter flange 210 is configured to be attached to the top alignment fixture 230 and the upper nut 202. The adapter flange 210, top alignment fixture 230, and bottom alignment fixture 240 cooperate to place the stationary seal assembly 134 into concentric alignment with the rotating seal assembly 122.

The adapter flange 210 includes a planar base 212 and an annular rim or flange 214 extending upward from the base 212. The base 212 includes a relatively enlarged central opening 216 to allow the passage of fluid from the stationary conduit to the rotating conduit through the swivel seal assembly 100. The base 212 further includes at least one mounting hole 218 configured to accept fasteners 223 to connect the adapter flange 210 with the top alignment fixture 230 and/or with the upper nut 202. The base 212 also includes a locating fixture 220 configured to align the upper nut 202 with the adapter flange 210. In the illustrated embodiment, the locating fixture 220 includes dowel pin inserted into a corresponding locating hole in the adapter flange 210. The annular flange 214 of the adapter flange 210 includes at least one, and preferably multiple, threaded through alignment securing holes 222 that are configured to accept set screws 225 or similar fasteners used to hold the upper nut 202 in positional alignment with the adapter flange 210 as described in more detail below.

The top mounting fixture 230 includes a mounting flange 232 and an alignment cylinder 234. The mounting flange 232 is provided with one or more mounting holes 236 to facilitate connection of the mounting flange with the adapter flange 210. The alignment cylinder 234 comprises an annular skirt extending from the mounting flange 232. The alignment cylinder 234 may be provided with a solid surface around its entire circumference but may also have openings or breaks if desired so long as the alignment cylinder 234 remains rigid and dimensionally consistent at all times during the alignment process described below.

The bottom mounting fixture 240 has a similar structure, including a mounting flange 242 with mounting holes 246 and an alignment cylinder 244. The mounting holes 246 facilitate mounting of the bottom alignment fixture 240 to the rotating lower nut 204. The alignment cylinder 244 comprises an annular skirt extending from the mounting flange 242. The alignment cylinder 234 may be provided with a solid surface around its entire circumference but may also have openings or breaks if desired.

The alignment cylinder 234 of the top alignment fixture 230 is provided with dimensions to allow for a sliding engagement with the alignment cylinder 244 of the bottom alignment fixture 240. In the illustrated embodiment, the alignment cylinder 234 of the top alignment fixture 230 is configured to slide within the alignment cylinder 244 of the bottom alignment fixture 240. More particularly, the alignment cylinder 234 of the top alignment fixture 230 is provided with an outside diameter allowing for a sliding engagement with the inside diameter of the alignment cylinder 244 of the bottom alignment fixture 240. The dimensions of the alignment cylinders 234, 244 provide for at least a sliding fit and, preferably, a locational clearance fit with minimal clearance to minimize radial play or movement of the alignment cylinders relative to one another. While the alignment cylinder 234 of the top alignment fixture 230 is configured to slide into the alignment cylinder 244 of the bottom alignment fixture 230 in the illustrated embodiment, this relative engagement of the alignment cylinders may be reversed.

When the bottom alignment fixture 240 is mounted to the lower nut 204 and the adapter flange 210 is mounted to the top alignment fixture 230, insertion of the top fixture alignment cylinder into the bottom fixture alignment cylinder concentrically positions the adapter flange 210 with the lower nut 204 and the rotating seal assembly 122 mounted on the lower nut 204.

Subsequently, the upper nut 202 may be aligned with the adapter flange 210 by inserting the locating fixture 220 of the adapter flange 210 into the upper nut alignment pilot 206. The adapter flange 210 may then be preliminarily secured to the upper nut 202 by fasteners threaded through the mounting hole(s) 218 of the adapter flange 210 and into corresponding mounting holes in the upper nut 202. Prior to fully tightening the fasteners, the set screws 225 may be inserted into and through the alignment securing holes 222 in the annular flange 214 until they contact the peripheral surface of the upper nut 202 to hold the upper nut into the concentric alignment position with the adapter flange 210 that has been obtained. At that time, the upper nut 202 may be fully secured to the adapter flange 210 by further tightening the fasteners.

Next, after removal of the top alignment fixture 230 and bottom alignment fixture 240, the washpipe assembly including the sleeve 126, carrier assembly 129, and stationary seal assembly 120 may be connected with the adapter flange 210 and upper nut 202 by fasteners connecting the flange 124 with the adapter flange 210 and upper nut 202. Through the previous alignment of the adapter flange 210 and upper nut 202, the sleeve 126, carrier assembly 129, and stationary seal assembly 120 will be concentrically aligned with the lower nut 204 and rotating seal assembly 122.

Figure 5:
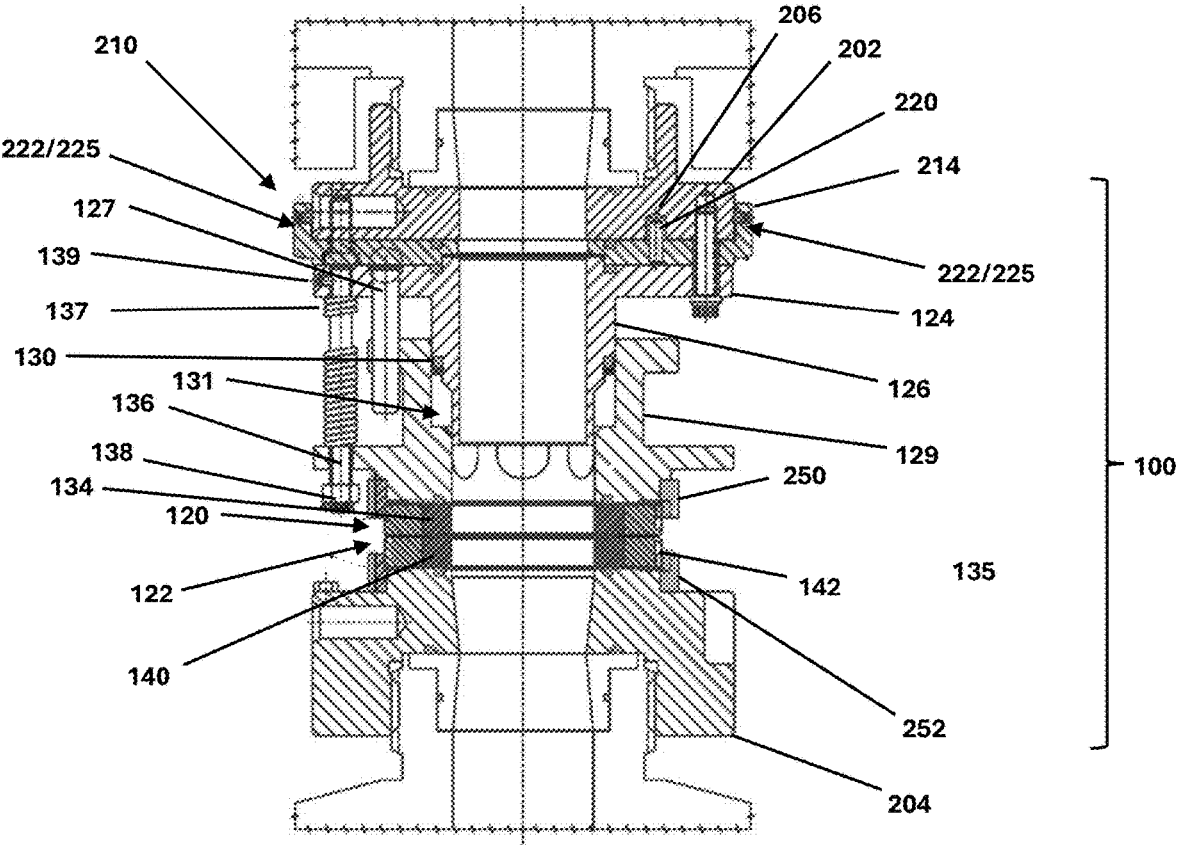
FIG. 5 is a cross-sectional view of the assembled swivel seal assembly of FIG. 3.

A second portion of the alignment assembly 200 serves to maintain the concentric alignment of the stationary seal assembly 120 and the rotating seal assembly 122 after the initial alignment and assembly process. The second portion of the alignment assembly 200 includes a stationary seal pilot ring 250 and a rotating seal pilot ring 252, as shown in FIGS. 4 and 5. The stationary seal pilot ring 250 is mounted to the carrier assembly 129 and maintains the stationary seal assembly 120 in a constant radial position relative to the carrier assembly 129 after the alignment method described below. The rotating seal pilot ring is similarly mounted to the rotating lower nut 204 and maintains a constant radial position of the rotating seal assembly 122 relative to the lower nut 204. The stationary seal pilot ring 250 and rotating seal pilot ring 252 may be mounted to the carrier assembly 129 and lower nut 204, respectively, with a press fit, heat shrinking, mechanically fastening or similar mounting process.

The components of the swivel seal assembly 100 and, particularly, the alignment assembly 200 coordinate to align the stationary 120 and rotating 122 seal assemblies to, in turn, concentrically align the annular projections 144, 145 of the stationary 134 and rotating 140 seal rings with one another and subsequently maintain such concentric alignment during operation of the swivel seal assembly. As a result, the initial alignment procedure does not need to be repeated.

Figures 7A, 7B, 7C:
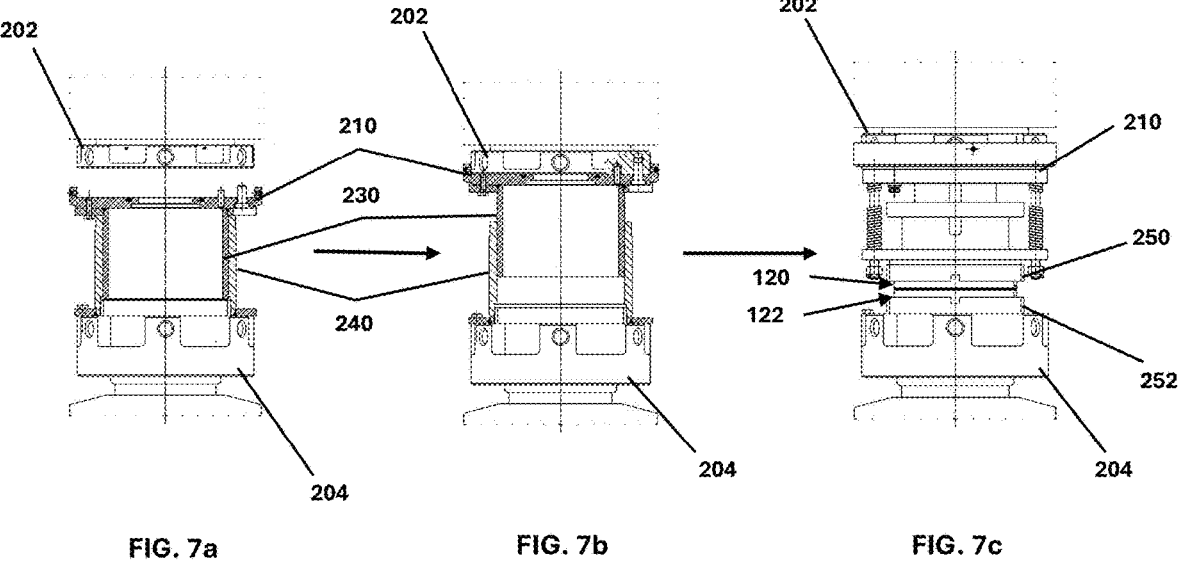
FIG. 7, which includes FIGS. 7*a*, 7*b* and 7*c*, schematically illustrates a swivel seal assembly in successive positions associated with a method of aligning a floating seal assembly according to an embodiment of the present disclosure.

Embodiments of a resulting alignment process may include the following steps as generally shown in FIG. 7:

Assemble the non-rotating upper nut 202 and rotating lower nut 204;

Secure the adapter flange 210 to the top alignment fixture 230 with fastener(s) through one or more of the top fixture mounting holes 218 and flange mounting holes 236 (FIG. 7a);

Mount the bottom alignment fixture 240 to the lower nut 204 with fastener(s) through the flange mounting holes 246 of the bottom alignment fixture 240 and corresponding mounting holes in the lower nut 204 (FIG. 7a);

Insert the top fixture alignment cylinder 234 into the bottom fixture alignment cylinder 244 and collapsed the top 230 and bottom 240 alignment fixtures together (FIG. 7a);

Alternately, the top fixture alignment cylinder 234 may be inserted into the bottom fixture alignment cylinder 244 before the bottom fixture is mounted to the lower nut 204;

Partially raise the top alignment fixture 230 and adapter flange 210 and align the locating fixture 220 with and insert it into the upper nut alignment pilot 206 to align the upper nut 202 with the adapter flange 210 (FIG. 7b);

Secure the upper nut 202 to the adapter flange 210 (FIG. 7b);

Remove the fasteners connecting the top 230 and bottom 240 alignment fixtures to the adapter flange 210 and lower nut 204, respectively, and remove the alignment fixtures 230, 240 from the seal assembly 100 (FIG. 7c);

Fasten the adapter flange 210 to the flange 124 of the sleeve 126 to connect the adapter flange 210 with the carrier assembly 129 and stationary seal assembly 120 (FIG. 7c).

Alternate embodiments of the alignment process may include the following additional steps:

After aligning the locating fixture 220 of the adapter flange 210 with the upper nut alignment pilot 206, finger tighten the fasteners connecting the adapter flange 210 and upper nut 202;

Finger tighten the set screws 225 through the adapter flange alignment securing holes 222 into contact with the perimeter of the upper nut 204 to secure the upper nut 204 in the concentrically aligned position with the adapter flange 210; and Fully tighten the fasteners connecting the adapter flange 210 and upper nut 202 and subsequently fully tighten the set screws 225.

The preferred embodiments of the disclosure have been described above to explain the principles of the present disclosure and its practical application to thereby enable others skilled in the art to utilize the present disclosure. However, as various modifications could be made in the constructions and methods herein described and illustrated without departing from the scope of the present disclosure, it is intended that all matter contained in the foregoing description or shown in the accompanying drawings, including all materials expressly incorporated by reference herein, shall be interpreted as illustrative rather than limiting. Thus, the breadth and scope of the present disclosure should not be limited by the above-described exemplary embodiment but should be defined only in accordance with the following claims appended hereto and their equivalents.

What is claimed is:

1. A swivel seal assembly having a non-rotating upper nut, having a sleeve and a carrier assembly and a stationary seal assembly connected with the carrier assembly, and a rotating lower nut having a rotating seal assembly mounted on the rotating lower nut, comprising:

a first alignment fixture having a flange and an alignment cylinder extending from the flange and wherein the first alignment fixture alignment cylinder is provided with an outside diameter;

a second alignment fixture having a flange and an alignment cylinder, wherein the second alignment fixture flange is configured for mounting to the rotating lower nut, wherein the second alignment fixture alignment cylinder is provided with an inside diameter greater than the outside diameter of the first alignment fixture alignment cylinder;

wherein the first alignment fixture alignment cylinder is configured to be inserted into the second alignment fixture alignment cylinder in a sliding fit;

an adapter flange having a planar base and an annular flange extending from the planar base, wherein the first alignment fixture flange is configured for mounting to the planar base and wherein the planar base includes at least one locating fixture extending from the planar base parallel to the annular flange of the adapter flange, wherein the adapter flange is concentrically aligned with the rotating lower nut and the rotating seal assembly when the first alignment cylinder is inserted into the second alignment cylinder;

wherein the non-rotating upper nut comprises an alignment pilot configured to accept the locating fixture of the adapter flange to position the non-rotating upper nut into concentric alignment with the adapter flange, the adapter flange being further configured for mounting to the sleeve and carrier assembly in concentric alignment;

wherein the stationary seal assembly comprises a stationary seal retainer and a stationary seal ring having an annular protrusion on a sealing surface of the stationary seal ring;

wherein the rotating seal assembly comprises a rotating seal retainer and a rotating seal ring having an annular protrusion on a sealing surface of the stationary seal ring; and wherein the stationary seal ring sealing surface and the rotating seal ring sealing surface face one another, and wherein the rotating seal ring annular protrusion and the stationary seal ring annular protrusion are concentrically aligned with and directly engage one another in a sealing relationship when the rotating seal assembly and stationary seal assembly are concentrically aligned with one another.

2. The swivel seal assembly of claim 1, further comprising:

a stationary seal pilot ring mounted on and concentrically aligned with the carrier assembly and configured to contain the stationary seal assembly within the stationary seal pilot ring in concentric alignment with the carrier assembly; and a rotating seal pilot ring mounted on and concentrically aligned with the lower nut and configured to contain the rotating seal assembly within the rotating seal pilot ring in concentric alignment with the lower nut.

3. An alignment assembly for a swivel seal assembly having a non-rotating upper nut, having a sleeve and a carrier assembly and a stationary seal assembly connected with the carrier assembly, a rotating lower nut having a rotating seal assembly mounted on the rotating lower nut, wherein the rotating seal assembly comprises a rotating seal retainer and a rotating seal ring having an annular protrusion on a sealing surface of the stationary seal ring, wherein the stationary seal ring sealing surface and the rotating seal ring sealing surface face one another, and wherein the rotating seal ring annular protrusion and the stationary seal ring annular protrusion are concentrically aligned with and directly engage one another in a sealing relationship when the rotating seal assembly and stationary seal assembly are concentrically aligned with one another, the alignment assembly comprising:

a first alignment fixture having a flange and an alignment cylinder extending from the flange and wherein the first alignment fixture alignment cylinder is provided with an outside diameter;

a second alignment fixture having a flange and an alignment cylinder, wherein the second alignment fixture flange is configured for mounting to the rotating lower nut, wherein the second alignment fixture alignment cylinder is provided with an inside diameter greater than the outside diameter of the first alignment fixture alignment cylinder;

wherein the first alignment fixture alignment cylinder is configured to be inserted into the second alignment fixture alignment cylinder in a sliding fit;

an adapter flange having a planar base and an annular flange extending from the planar base, wherein the first alignment fixture flange is configured for mounting to the planar base and wherein the planar base includes at least one locating fixture extending from the planar base parallel to the annular flange of the adapter flange, wherein the adapter flange is concentrically aligned with the rotating lower nut and the rotating seal assembly when the first alignment cylinder is inserted into the second alignment cylinder;

wherein the non-rotating upper nut comprises an alignment pilot configured to accept the locating fixture of the adapter flange to position the non-rotating upper nut into concentric alignment with the adapter flange, the adapter flange being further configured for mounting to the sleeve and carrier assembly in concentric alignment;

wherein the stationary seal assembly comprises a stationary seal retainer and a stationary seal ring having an annular protrusion on a sealing surface of the stationary seal ring;

wherein the rotating seal assembly comprises a rotating seal retainer and a rotating seal ring having an annular protrusion on a sealing surface of the stationary seal ring;

wherein the stationary seal ring sealing surface and the rotating seal ring sealing surface face one another, and wherein the rotating seal ring annular protrusion and the stationary seal ring annular protrusion are concentrically aligned with and directly engage one another in a sealing relationship when the rotating seal assembly and stationary seal assembly are concentrically aligned with one another;

a stationary seal pilot ring mounted on and concentrically aligned with the carrier assembly and configured to contain the stationary seal assembly within the stationary seal pilot ring in concentric alignment with the carrier assembly; and a rotating seal pilot ring mounted on and concentrically aligned with the rotating lower nut and configured to contain the rotating seal assembly within the rotating seal pilot ring in concentric alignment with the rotating lower nut.

4. A method of aligning a swivel seal assembly having a non-rotating upper nut, having a sleeve and a carrier assembly and a stationary seal assembly connected with the carrier assembly, a rotating lower nut having a rotating seal assembly mounted on the rotating lower nut, wherein the rotating seal assembly comprises a rotating seal retainer and a rotating seal ring having an annular protrusion on a sealing surface of the stationary seal ring and having an inside diameter and an outside diameter, wherein the stationary seal ring sealing surface and the rotating seal ring sealing surface face one another, and wherein the inside diameter and outside diameter of the rotating seal ring annular protrusion are approximately the same as the insider diameter and outside diameter of the stationary seal ring annular protrusion such that the rotating seal ring annular protrusion and the stationary seal ring annular protrusion are concentrically aligned with and directly engage one another in a sealing relationship when the rotating seal assembly and stationary seal assembly are concentrically aligned with one another, the method comprising:

assembling the non-rotating upper nut and rotating lower nut;

mounting an adapter flange to a flange of a top alignment fixture;

mounting a bottom alignment fixture to the lower nut;

inserting an alignment cylinder of the top alignment fixture into an alignment cylinder of the bottom alignment fixture and collapsing the top and bottom alignment fixtures together;

raise the top alignment fixture and adapter flange and align a locating fixture of the adapter flange with an alignment pilot of the non-rotating upper nut to align the non-rotating upper nut with the adapter flange;

secure the upper nut to the adapter flange;

remove the top and bottom alignment fixtures; and fasten the adapter flange to the sleeve, carrier assembly, and stationary seal assembly.

\* \* \* \* \*